(12) United States Patent
Kim et al.

(10) Patent No.: US 9,889,602 B2
(45) Date of Patent: Feb. 13, 2018

(54) LAMINATING DEVICE AND LAMINATING METHOD USING THE SAME

(71) Applicant: Samsung Display Co., Ltd., Yongin-si, Gyeonggi-do (KR)

(72) Inventors: Choongsik Kim, Anyang-si (KR); Yudeok Seo, Hwaseong-si (KR); Jaeyoung Kim, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/264,542

(22) Filed: Sep. 13, 2016

(65) Prior Publication Data

US 2017/0100922 A1    Apr. 13, 2017

(30) Foreign Application Priority Data

Oct. 13, 2015    (KR) .................. 10-2015-0143069

(51) Int. Cl.
*B29C 65/00*    (2006.01)
*B32B 37/10*    (2006.01)
*H04B 1/00*    (2006.01)
*B32B 37/00*    (2006.01)
*B32B 38/18*    (2006.01)

(52) U.S. Cl.
CPC .......... *B29C 66/345* (2013.01); *B32B 37/10* (2013.01); *H04B 1/00* (2013.01); *B32B 37/003* (2013.01); *B32B 38/1866* (2013.01); *B32B 2315/08* (2013.01); *B32B 2457/20* (2013.01)

(58) Field of Classification Search
CPC ..... B29C 66/342; B29C 66/345; B29C 66/81; B29C 66/81457; B29C 66/81421; B29C 66/81422; B29C 66/81423; B32B 37/003; B32B 37/10; B32B 38/1866
See application file for complete search history.

(56) References Cited

U.S. PATENT DOCUMENTS

| | | | |
|---|---|---|---|
| 3,873,395 A * | 3/1975 | Ehrlich | B27D 3/00 100/211 |
| 4,564,408 A | 1/1986 | Crumbach et al. | |
| 5,494,546 A | 2/1996 | Horvath | |
| 5,733,410 A * | 3/1998 | Gore | B29C 63/02 156/542 |
| 8,511,362 B2 | 8/2013 | Walczyk et al. | |
| 2013/0241128 A1* | 9/2013 | Eda | B32B 37/003 269/21 |

(Continued)

FOREIGN PATENT DOCUMENTS

KR    10-1468973    12/2014

*Primary Examiner* — John Goff
(74) *Attorney, Agent, or Firm* — Lewis Roca Rothgerber Christie LLP (57) ABSTRACT

A laminating device includes a first jig on which a first member is seated, a second jig facing the first jig, and a second member between the first jig and the second jig. The second jig includes a pad part having a top surface on which the second member is seated, the pad part having elasticity, a pad deformation part configured to support a rear surface of the pad part, and a support part to support the pad deformation part. The pad deformation part couples the pad part to the support part, and a portion of the pad deformation part has a recessed plate shape with respect to the pad part to correspond to a position thereof coupled to the support part.

9 Claims, 6 Drawing Sheets

(56) References Cited

U.S. PATENT DOCUMENTS

2014/0002975 A1* 1/2014 Lee ..................... H05K 5/0017
361/679.01
2014/0345791 A1 11/2014 Son et al.
2014/0373996 A1* 12/2014 Kim ....................... B32B 37/10
156/60

* cited by examiner

LAMINATING DEVICE AND LAMINATING METHOD USING THE SAME

CROSS-REFERENCE TO RELATED APPLICATION

This U.S. non-provisional patent application claims priority to and the benefit of Korean Patent Application No. 10-2015-0143069, filed on Oct. 13, 2015, the entire contents of which are hereby incorporated by reference.

BACKGROUND

1. Field

The present disclosure herein relates to a laminating device and a laminating method using the same, and for example, to a laminating device that decreases a failure rate of products to increase process efficiency and a laminating method using the same.

2. Description of Related Art

In recent years, electronic devices based on portability have been widely used. As portable electronic devices such as, for example, a tablet PC in addition to small sized electronic devices such as a mobile phone, has been widely used in recent years.

The above-described portable electronic devices include a display apparatus for providing visual information such as, for example, an image or a video to a user to support various functions. As components for driving the display apparatus are downsized, the importance of the display apparatus in the electronic devices has gradually increased. For example, as the electronic devices have included various designs in recent years, the needs for a flexible display apparatus have increased.

SUMMARY

Aspects of embodiments of the present disclosure provide a laminating device for decreasing a failure rate of products to thereby increase process efficiency and a laminating method using the same.

An embodiment of the present disclosure provides a laminating device including: a first jig on which a first member is seated; a second jig facing the first jig; and a second member between the first jig and the second jig. The second jig includes: a pad part having a top surface on which the second member is seated, the pad part having elasticity; a pad deformation part configured to support a rear surface of the pad part; and a support part configured to support the pad deformation part. The pad deformation part is configured to couple (or connect) the pad part to the support part, and a portion of the pad deformation part has a recessed plate shape with respect to the pad part to correspond to a position thereof coupled (or connected) to the support part.

In an embodiment, the first jig may include a recessed part having a curved surface on one surface of the first jig, and the first member is seated on the recessed part to correspond to a shape of the recessed part.

In an embodiment, the pad part may have a shape protruding toward the second member.

In an embodiment, the laminating device may further include a pressing part coupled (or connected) to at least either the first jig or the second jig to press the first jig or the second jig. The first jig and the second jig may be coupled to each other by the pressing part.

In an embodiment, as a pressure at which the pressing part presses the first jig or the second jig increases, a distance between the support part and the second member may decrease.

In an embodiment, the pad deformation part may include: a fixed portion fixed to the support part; a first deformation portion extending from the fixed portion to one side of the fixed portion; and a second deformation portion extending from the fixed portion to the other side of the fixed portion.

In an embodiment, the first and second deformation portions may be configured to support the rear surface of the pad part, and an angle between the first and second deformation portions may increase as the pressure at which the pressing part presses the first jig or the second jig increases.

In an embodiment, the angle between the first and second deformation portions may be equal to or less than about 180°.

In an embodiment, each of the first and second deformation portions may have a plate shape protruding toward the pad part.

In an embodiment, the support part may include support protrusions overlapping the first and second deformation portions and protruding from the support part toward the first and second deformation portions, and each of the support protrusions has a height less than that of the fixed portion.

In an embodiment, the first deformation portion may have a shape that is symmetrical to that of the second deformation portion with respect to the fixed portion.

In an embodiment, the first member may be a cover window, and the second member may be a panel member.

In an embodiment of the present disclosure, a laminating method includes: seating a first member on a first jig; disposing a second jig provided with a pad part having elasticity and a pad deformation portion having a plate shape to support a rear surface of the pad part; disposing a second member between the first jig and the second jig; and pressing the first jig or the second jig to laminate the first member and the second member. The laminating of the first member and the second member includes: closely attaching a central area of the first member to a central portion of the second member by using the pad part pressed by the pad deformation portion; and closely attaching edges of the first and second members to each other. The second jig includes: a pad part on which the second member is seated, the pad part having elasticity; a pad deformation part configured to support a rear surface of the pad part; and a support part configured to support the pad deformation part. When the first jig or the second jig is pressed, the pad part is deformed in shape by the pad deformation part.

In an embodiment, a top surface of the pad part may have a shape protruding toward the first member, and, as a pressure at which the first jig or the second jig is pressed increases, an outer surface of the pad part may be deformed to be flat.

In an embodiment, the pad deformation part may include: a fixed portion fixed to the support part; and a first deformation portion extending from the fixed portion to one side of the fixed portion; a second deformation portion extending from the fixed portion to the other side of the fixed portion. As a pressure at which the pressing part presses the first jig or the second jig increases, an angle between the first and second deformation portions may increase.

BRIEF DESCRIPTION OF THE DRAWINGS

The accompanying drawings are included to provide a further understanding of the subject matter of the present disclosure, and are incorporated in and constitute a part of this specification. The drawings illustrate exemplary embodiments of the present disclosure and, together with the description, serve to explain principles of embodiments of the present disclosure. In the drawings.

DETAILED DESCRIPTION

Features or embodiments of the present disclosure, and embodiments of implementation methods thereof will be clarified through the following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by the scope of the appended claims and equivalents thereof. Like reference numerals refer to like elements throughout.

Spatially relative terms, such as "below", "beneath", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. Like reference numerals refer to like elements throughout.

It will be understood that, although the terms first, second, etc. may be used herein to describe various elements, components, and/or sections, these elements, components, and/or sections should not be limited by these terms. These terms are only used to distinguish one element, component, or section from another element, component, or section. Thus, a first element, component, or section discussed below could be termed a second element, component, or section and remain within the technical idea of the present disclosure.

The embodiments in the detailed description will be described with schematic cross-sectional views and/or plan views as ideal (or suitable) exemplary views of the present disclosure. Accordingly, shapes of the exemplary views may be modified according to manufacturing techniques and/or allowable errors. Additionally, in the drawings, the relative sizes of elements, layers, and regions may be exaggerated for clarity. Therefore, the embodiments of the present disclosure are not limited to the specific shape illustrated in the drawings, but may include other shapes that may be created according to manufacturing processes. Areas exemplified in the drawings have general properties, and are used to illustrate a specific (or set) shape of a semiconductor package region. Thus, this should not be construed as limited to the scope of the present disclosure.

It will be understood that when an element or layer is referred to as being "on," "connected to," or "coupled to" another element or layer, it can be directly on, connected to, or coupled to the other element or layer, or one or more intervening elements or layers may be present. For example, as described herein, the first jig and the second jig may be directly or indirectly coupled to each other. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. For example, as disclosed herein, a laminating device including a first jig and a second jig may include a plurality of first and second jigs. It will be further understood that the terms "comprises," "comprising," "includes," and "including," when used in this specification, specify the presence of the stated features, integers, acts, operations, elements, and/or components, but do not preclude the presence or addition of one or more other features, integers, acts, operations, elements, components, and/or groups thereof. As used herein, the term "and/or" includes any and all combinations of one or more of the associated listed items. Expressions such as "at least one of," and "at least one selected from," when preceding a list of elements, modify the entire list of elements and do not modify the individual elements of the list.

Hereinafter, exemplary embodiments of the present disclosure will be described below in more detail with reference to the accompanying drawings.

Figure 1:
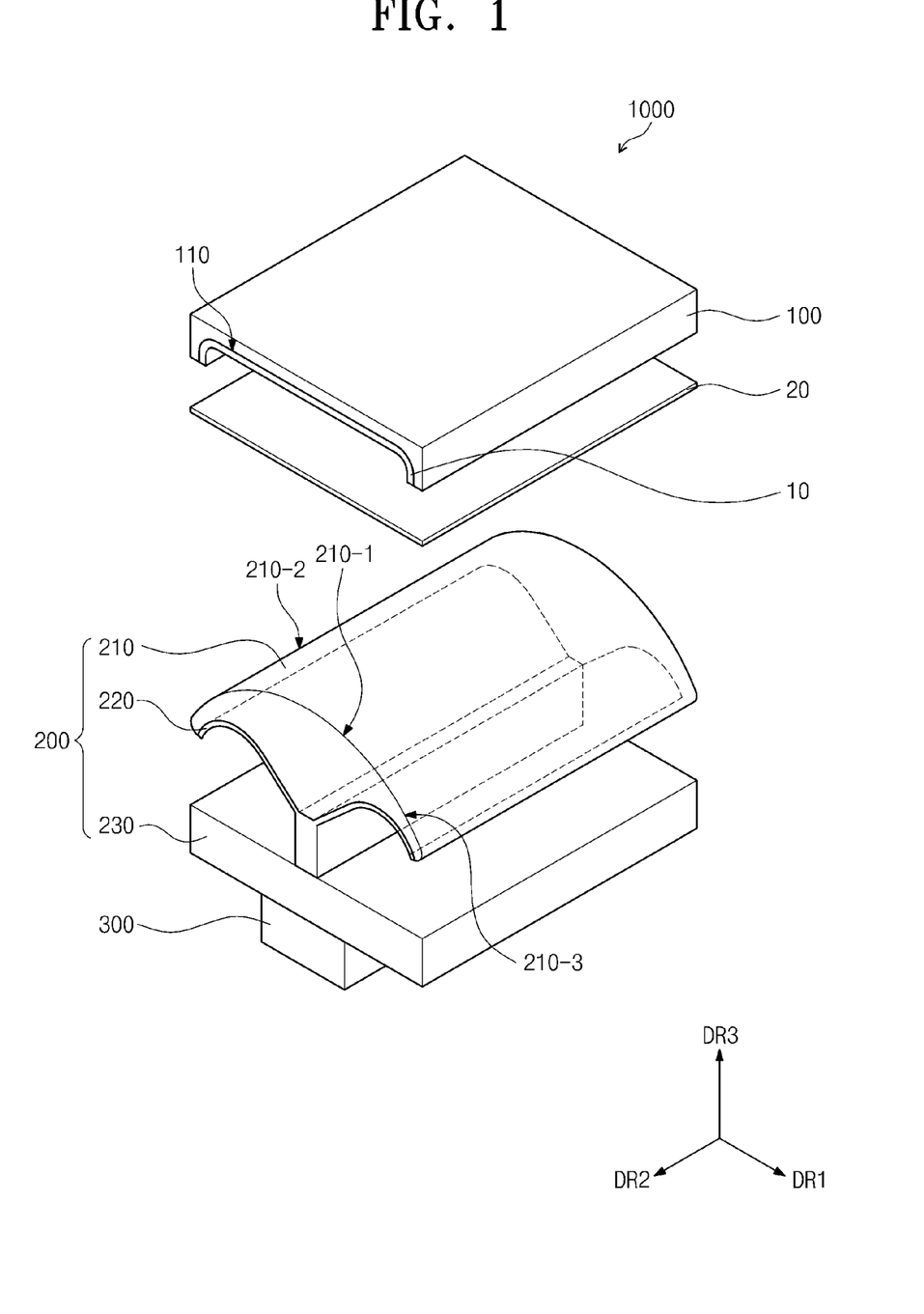
FIG. 1 is a perspective view of a laminating device according to an embodiment of the present disclosure.

FIG. 1 is a perspective view of a laminating device according to an embodiment of the present disclosure.

Referring to FIG. 1, a laminating device 1000 includes a first jig 100 and a second jig 200. At least one selected from the first jig 100 and the second jig 200 may repeatedly move in upward and downward directions. For example, at least one selected from the first jig 100 and the second jig 200 may move in a first direction (e.g., upward or downward), followed by moving in a second direction, and then the cycle may be repeated. As the first jig 100 or the second jig 200 moves, the first jig 100 and the second jig 200 may be coupled to each other or separated from each other. When the first jig 100 and the second jig 200 are coupled to each other, a first member 10 and a second member 20, which are disposed between the first jig 100 and the second jig 200, may be closely attached to each other.

According to an embodiment of the present disclosure, the laminating device 1000 may further include a pressing part 300. The pressing part 300 may be coupled to the second jig 200 to press the second jig 200 in the upward direction. Although the second jig 200 moves in the upward direction by (or due to) the pressing part 300, an embodiment of the present disclosure is not limited thereto.

For example, according to an embodiment of the present disclosure, the pressing part 300 may be coupled to the first jig 100 to press the first jig 100 in the downward direction. In this case, the first jig 100 may move in the downward direction by (or due to) the pressing part 300.

The first member 10 may be seated on the first jig 100. According to an embodiment, the first jig 100 may include a recessed part 110, and the first member 10 may be seated on the recessed part 110. For example, the first member may directly contact the recessed part 110 and may follow a contour of the recessed part 110.

At least one portion of the recessed part 110 may have a curved surface. For example, the first member 10 may be manufactured to have at least one portion having a curved surface. According to an embodiment of the present disclosure, each of both sides of the recessed part 110 may have a curved surface in a first direction DR1.

The first jig 100 may temporarily fix the first member 10. The first member 10 may be slim (e.g., thin). For example, the first member 10 may be a cover glass constituting a portion of the display device 1000.

The first jig 100 may be disposed to face the second jig 200. The second member 20 is disposed between the first jig 100 and the second jig 200.

The second member 20, which has a plate shape, may have flexibility (e.g., the second member 20 may be flexible). Although the second member 20 is a display panel constituting a portion of the display device 1000 according to an embodiment, an embodiment of the present disclosure is not limited thereto. For example, according to an embodiment of the present disclosure, the second member 20 may be a touch panel or a polarizer.

The second jig 200 in ides a pad part 210, a pad deformation part 220, and a support part 230.

The pad part 210 includes an elastic material. For example, according to an embodiment of the present disclosure, the pad part 210 may include silicon (Si). For example, the pad part 210 may include silicone including the silicon (Si).

When an external force is applied to at least a portion of the pad part 210, a shape of at least one portion of the pad part 210 may be deformed from a shape before the external force is applied thereto (e.g., the shape of the portion of the pad part 210 may deform when an external force is applied thereto). Also, when the external force applied to the pad part 210 is removed, the pad part 210 may be restored to an original shape before the external force is applied thereto (e.g., at least a portion of the pad part 210 may be resilient). Accordingly, when the pad part 210 presses the second member 20, a force for pressing the second member 20 may not be concentrated on one portion of the second member 20 and may be provided to an entire area (e.g., substantially an entire area) of the second member 20.

As a result, when the first jig 100 and the second jig 200 are coupled to each other, it may be prevented that the second member 20 is damaged by the pressing force (or a likelihood or amount of such damage may be reduced).

The pad part 210 may have a front surface protruding toward the first jig 100. In more detail, the front surface of the pad part 210 may include a top portion 210-1 disposed on a central area (e.g., a substantially central area) of the pad part 210 and first and second inclined portions 210-2 and 210-3 that are inclined toward respective (or both) sides of the top portion 210-1 in the first direction DR1.

Since the pad part 210 has a protruding shape, when the first jig 100 and the second jig 200 are coupled to each other, a central area (e.g., a substantially central area) of the second member 20 may be pressed earlier than (e.g., before) both side edges (e.g., edge portions) of the second member 20 in the first direction DR1.

In more detail, when the first jig 100 and the second jig 200 are coupled to each other, the central area (e.g., the substantially central area) of the second member 20 may be coupled to the top portion 210-1, and then, the edge portions of the second member 20 may be coupled to the first and second inclined portions 210-2 and 210-3.

The pad deformation part 220 supports a rear surface of the pad part 210. Although the pad deformation part 220 includes metal, an embodiment of the present disclosure is not limited thereto. For example, according to an embodiment of the present disclosure, the pad deformation part 220 may include plastic. The pad deformation part 220 serves to transfer a pressure provided from the pressing part 300 to the pad part 210 and serves to distribute the pressure (e.g., serves to distribute the pressure across the rear surface of the pad part 210).

Figure 2A:
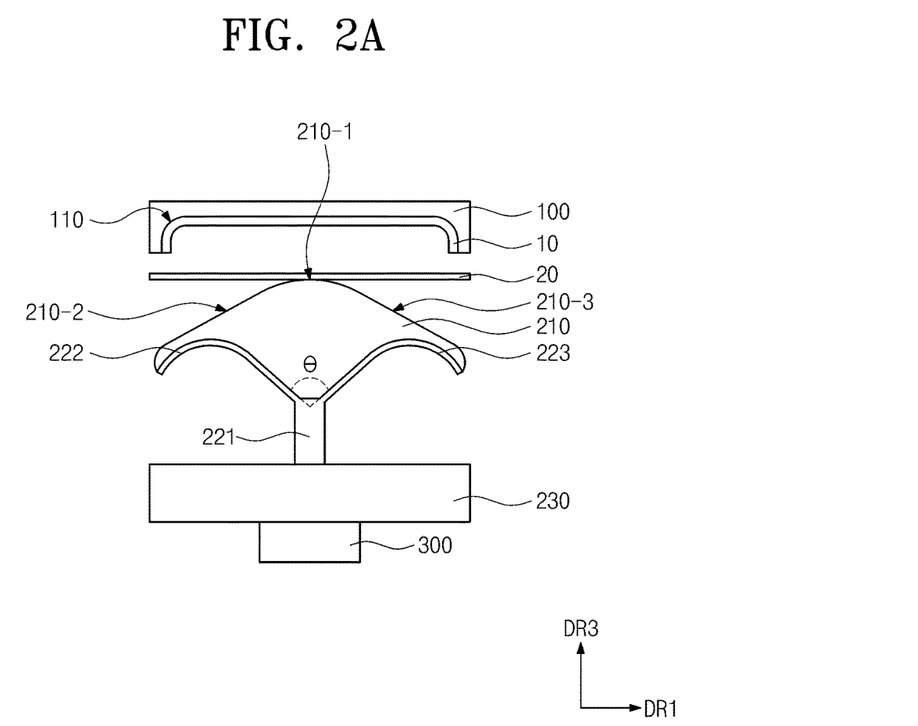
FIGS. 2A-2D are views illustrating a laminating process using the laminating device.

As shown in FIG. 2A, the pad deformation part 220 includes a fixed portion 221, a first deformation portion 222, and a second deformation portion 223. Although the pad deformation part 220 includes two deformation portions 222 and 223 according to an embodiment of the present disclosure, embodiments of the present disclosure are not limited thereto. For example, according to an embodiment of the present disclosure, the pad deformation part 220 may include one deformation portion (e.g., a sole deformation portion) or at least three deformation portions (e.g., three, or more, deformation portions).

The fixed portion 221 is fixed to the support part 230. The first deformation portion 222 and the second deformation portion 223 are coupled (or connected) to the fixed portion 221 to extend away from respective (or both) sides of the fixed portion 221. In some embodiments, the first deformation portion 222 and the second deformation portion 223 are coupled (or connected) to each other by the fixed portion 221 to form a V shape. For example, an angle θ defined by the first and second deformation portions 222 and 223 is equal to or less than about 180°.

Each of the first and second deformation portions 222 and 223 has a plate shape including a curved surface. In more detail, although each of the first and second deformation portions 222 and 223 has a surface protruding toward the pad part 210, an embodiment of the present disclosure is not limited thereto. For example, according to an embodiment of the present disclosure, each of the first and second deformation portions 222 and 223 may have a flat plate shape.

Each of the first and second deformation portions 222 and 223 may have a front surface that contacts the rear surface of the pad part 210 to support the rear surface of the pad part 210.

The first and second deformation portions 222 and 223 may have elasticity (and/or resiliency) according to the above-described structure. For example, when the first jig 100 and the second jig 200 are coupled to each other, shapes of the first and second deformation portions 222 and 223 may be deformed.

As the shapes of the first and second deformation portions 222 and 223 are deformed, the shape of the pad part 210 supported by the first and second deformation portions 222 and 223 may be deformed. The shapes of the pad deformation part 220 and the pad part 210 will be described below in more detail with reference to FIGS. 2A-2D.

The support part 230 is disposed below the pad deformation part 220 to support the pad deformation part 220. The support part 230 has a plate shape.

The pressing part 300 may be coupled to the first jig 100 or the second jig 200 to enable the first jig 100 or the second jig 200 to move linearly (e.g., substantially linearly). For example, according to an embodiment of the present disclosure, the pressing part 300 may be coupled to a lower portion of the support part 230 of the second jig 200 to enable the second jig 200 to move in the upward or downward direction. As the second jig 200 moves in the upward or downward direction by the pressing part 300, the first member 10 and the second member 20 may be closely attached to each other.

According to an embodiment of the present disclosure, the second jig 200 may not include the support part 230. For example, the pad deformation part 220 may be fixed to the pressing part 300, and the pad part 210 and the pad deformation part 220 may move in the upward or downward direction by the pressing part 300.

FIGS. 2A-2D are views illustrating an embodiment of a laminating method using the laminating device.

Referring to FIG. 2A, the first member 10 is seated on the first jig 100 to closely attach the first member 10 to the second member 20. The second member 20 is disposed between the first jig 100 and the second jig 100 disposed to face the first jig 100. Here, the second member 20 is disposed to correspond to the first member 10, and the central area (e.g., the substantially central area) of the second member 20 is disposed to correspond to the central area (e.g., the substantially central area) of the pad part 210.

Figure 2B:
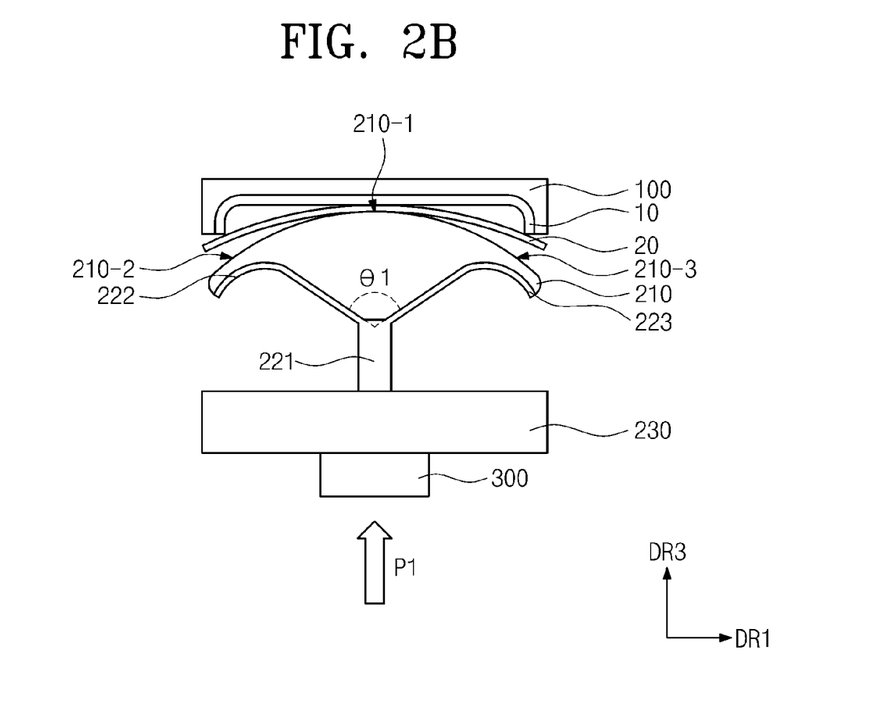

Referring to FIG. 2B, the pressing part 300 provides a first pressure P1 to the second jig 200. The second jig 200 moves toward the first jig 100 by (or due to) the first pressure P1.

In more detail, the first pressure P1 generated by the pressing part 300 is provided to the pad deformation part 220, and the pad deformation part 220 transfers the first pressure P1 to the pad part 210.

As the second jig 200 moves, the top portion 210-1 of the pad part 210 may press the second member 20. Here, the central area (e.g., the substantially central area) of the first member 10 may be closely attached to the central area (e.g., the substantially central area) of the second member 20. Here, the second member 20 may be bent to protrude toward the first member 10 by the first pressure P1.

When the first pressure P1 is provided to the second jig 200, the first and second deformation portions 222 and 223 may be angled at a set (or predetermined) angle. An angle between the first deformation portion 222 and the second deformation portion 223, which extend away from respective (or both) sides of the fixed portion in the first direction DR1, may be defined as a first angle θ1.

Figure 2C:
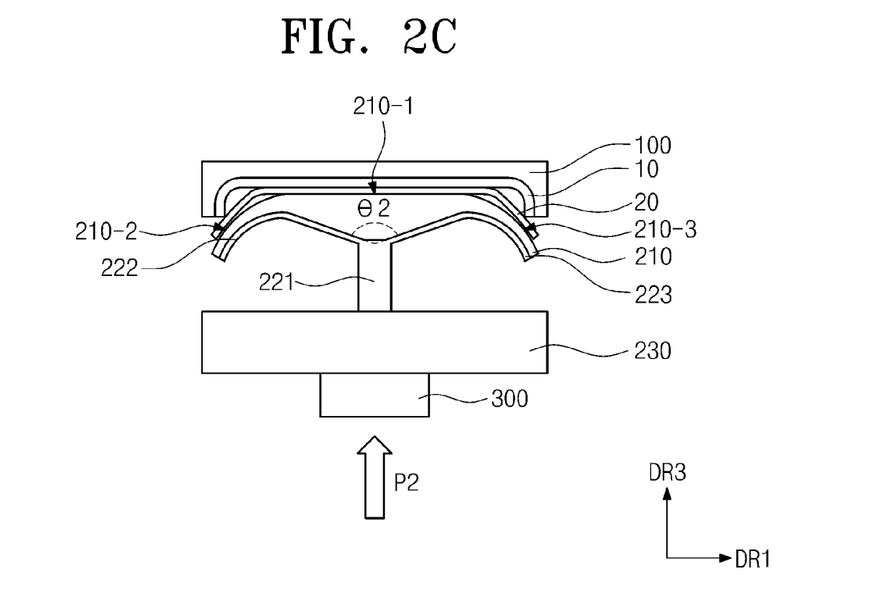

Referring to FIG. 2C, the pressing part 300 provides a second pressure P2 to the second jig 200. The second pressure P2 is greater than the first pressure P1.

As the second pressure P2 is provided to the second jig 200, the shapes of the pad part 210 and pad deformation part 220 of the second jig 200 are deformed. In more detail, as the support part 230 and the fixed portion 221 move toward the first jig 100 by the second pressure P2, an angle between the first and second deformation portions 222 and 223 extending away from respective (or both) sides of the fixed portion 221 in the first direction DR1 may increase. For example, the first deformation portion 222 and the second deformation portion 223 may be inclined toward respective (or both) sides of the pad part 210 in the first direction DR1.

When the second pressure P2 is provided to the second jig 200, the angle between the first and second deformation portions 222 and 223 is defined as a second angle θ2. The second angle θ2 is greater than the first angle θ1.

As the first deformation portion 222 and the second deformation portion 223 are inclined toward respective (or both) sides of the pad part 210 in the first direction DR1, an area in which the pad part 210 presses the second member 20 increases. Thus, an area in which the first member 10 is closely attached to the second member 20 increases.

In more detail, the area in which the first member 10 is closely attached to the second member 20 by the second pressure P2 expands from the central area (e.g., the substantially central area) of the first and second members 10 and 20 to the both side edges of the first and second members 10 and 20 in the first direction DR1.

Figure 2D:
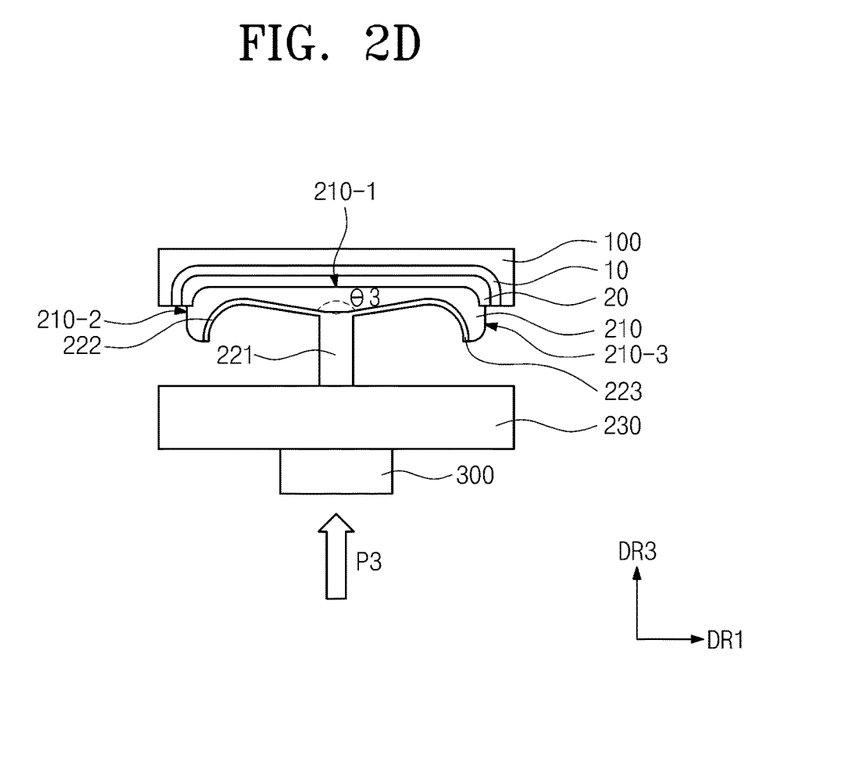

Referring to FIG. 2D, the pressing part 300 provides a third pressure P3 to the second jig 200. The third pressure P3 is greater than the second pressure P2.

As the support part 230 and the fixed portion 221 move toward the first jig 100 by the third pressure P3, an angle between the first and second deformation portions 222 and 223 extending away from respective (or both) sides of the fixed portion 221 in the first direction DR1 may increase. For example, the first deformation portion 222 and the second deformation portion 223 may be inclined toward respective (or both) sides of the pad part 210 in the first direction DR1.

When the third pressure P3 is provided to the second jig 200, the angle between the first and second deformation portions 222 and 223 is defined as a third angle θ3. The third angle θ3 is greater than the second angle θ2. The third angle θ3 is equal to or less than about 180°.

As the first deformation portion 222 and the second deformation portion 223 are inclined toward respective (or both) sides of the pad part 210 in the first direction DR1, the pad part 210 may press the both side edges of the second member 20 in the first direction DR1.

The pad part 210 may contact an entire (e.g., substantially an entire) rear surface of the second member 20, and an entire (e.g., substantially an entire) rear surface of the first member 10 may be closely attached to an entire (e.g., substantially an entire) front surface of the second member 20.

As a result, as a pressure provided to the second jig 200 increases, the first and second deformation portions 222 and 223 may be inclined toward respective (or both) sides of the pad part 210 in the first direction DR1. Accordingly, the shape of the pad part 210 may be deformed, and a direction of the pressing force provided to the second member 20 by the pad part 210 may be transferred from the central area (e.g., the substantially central area) to the edges of the second member 20.

According to an embodiment of the present disclosure, as the pad deformation part 220 allows the pad part 210 to be deformed, the pressing force provided to the second member 20 by the pad part 210 may be distributed (e.g., may be distributed across the second member 20). Thus, the second member 20 may be prevented from being damaged (or a likelihood or amount of such damage may be reduced).

Also, since the pad part 210 sequentially presses areas from the central areas (e.g., the substantially central areas) of the first and second members 10 and 20 to both side edges of the first and second members 10 and 20 in the first direction DR1, bubbles generated on the edges of the first and second member 10 and 20 during a laminating process may be prevented (or a likelihood or amount of the generation of such bubbles may be reduced).

As a result, the laminating device 1000 according to an embodiment of the present disclosure may decrease a failure rate of products to thereby increase process efficiency.

Figure 3:
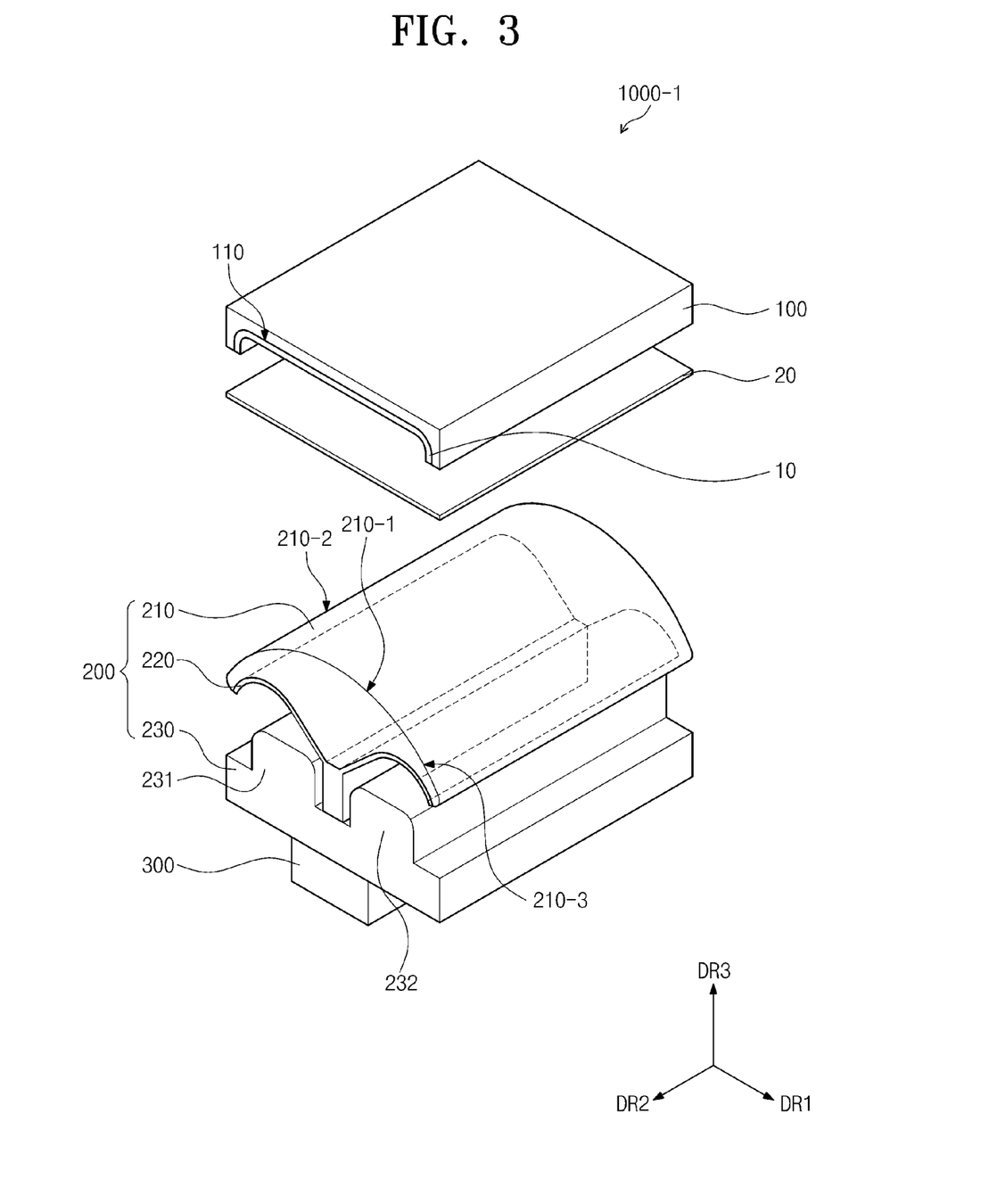
FIG. 3 is a perspective view of a laminating device according to an embodiment of the present disclosure.

FIG. 3 is a perspective view of a laminating device according to an embodiment of the present disclosure.

In describing FIG. 3, reference numerals for the above-described elements are given, and description that overlaps with the description for the elements shown in FIG. 1 and FIGS. 2A-2D will not be repeated here.

Referring to FIG. 3, according to an embodiment of the present disclosure, a laminating device 1000-1 includes a support part 230 including a first support protrusion 231 and a second support protrusion 232, which protrude upward from the support part 230. The first support protrusion 231 and the second support protrusion 232 extend in a second direction DR2.

The first support protrusion 231 and the second support protrusion 232 are spaced apart from each other with a fixed portion 221 of a pad deformation part 220 therebetween. In more detail, the first support protrusion 231 is disposed adjacent to one side of the fixed portion 221 in a first direction DR1, and the second support protrusion 232 is disposed adjacent to the other side of the fixed portion 221 in the first direction DR1.

The first support protrusion 231 is disposed below a first deformation portion 232 to correspond to the first deformation portion 222 of the pad deformation part 220, and the second support protrusion 232 is disposed below a second deformation portion 223 to correspond to the second deformation portion 223 of the pad deformation part 220.

Figure 4A:
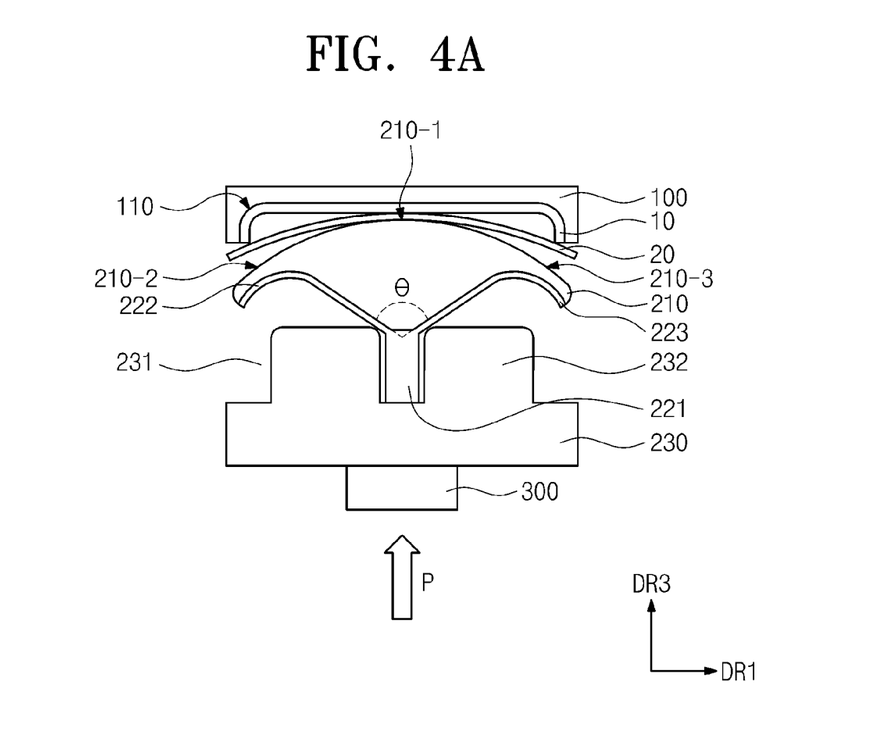
FIGS. 4A-4B are views illustrating an operation of the laminating device according to an embodiment of the present disclosure.
Figure 4B:
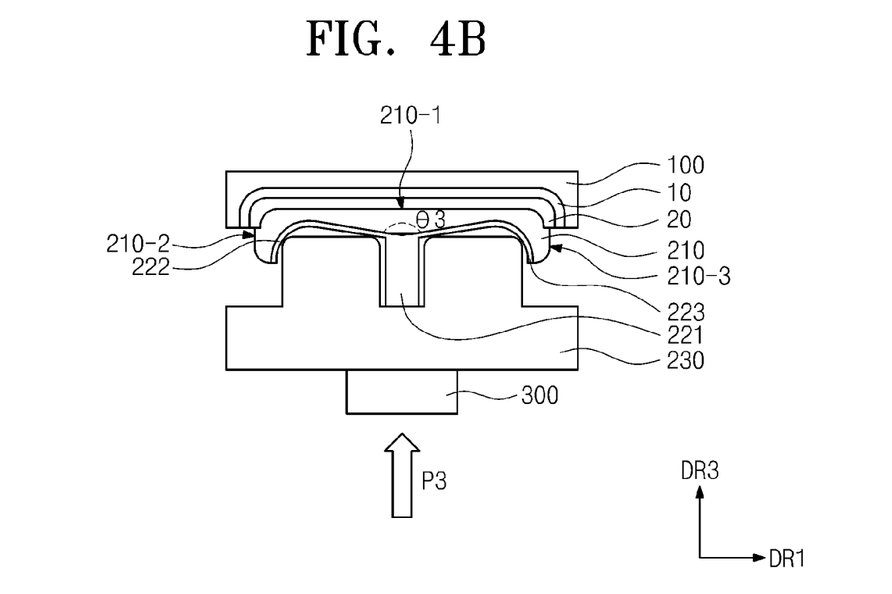

FIGS. 4A-4B are views illustrating an operation of the laminating device according to an embodiment of the present disclosure.

Referring to FIGS. 4A-4B, the first support protrusion 231 and the second support protrusion 232 serve to guide the first deformation portion 222 and the second deformation portion 223.

In more detail, when the first deformation portion 222 and the second deformation portion 223 are inclined toward respective (or both) sides of a second member 20 in the first direction DR1, the first support protrusion 231 and the second support protrusion 232 support the first deformation portion 222 and the second deformation portion 223 to enable an angle θ between the first deformation portion 222 and the second deformation portion 223 to be equal to or less than about 180°. For example, the first support protrusion 231 and the second support protrusion 232 serve to support the first deformation portion 222 and the second deformation portion 223 so that the first deformation portion 222 and the second deformation portion 223 are not disposed lower than a top surface of the fixed portion 221.

Thus, the laminating device 1000 according to an embodiment of the present disclosure may improve accuracy of the process and also prevent the pad deformation part 210 from being damaged (or a likelihood or amount of such damage may be reduced).

According to an embodiment of the present disclosure, the laminating device and the laminating method using the same may decrease the failure rate of products to increase the process efficiency.

As used herein, the terms "substantially," "about," and similar terms are used as terms of approximation and not as terms of degree, and are intended to account for the inherent deviations in measured or calculated values that would be recognized by those of ordinary skill in the art, such as those encountered measuring the angle defined by the first and second deformation portions. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Although exemplary embodiments of the present disclosure have been described, it is understood that the present disclosure should not be limited to these exemplary embodiments but various changes and modifications can be made by one ordinary skilled in the art and the subject matter will still remain within the spirit and scope of the appended claims, and equivalents thereof. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A laminating device comprising:
a first jig on which a first member is seated;
a second jig facing the first jig;
a second member between the first jig and the second jig; and
a pressing part coupled to at least the first jig or the second jig to press the first jig or the second jig, the first jig and the second jig being coupled to each other by the pressing part,
wherein the second jig comprises:
a pad part having a top surface on which the second member is seated, the pad part having elasticity;
a pad deformation part to support a rear surface of the pad part; and
a support part to support the pad deformation part,
wherein the pad deformation part couples the pad part to the support part, and a portion of the pad deformation part has a recessed plate shape with respect to the pad part to correspond to a position thereof coupled to the support part,
wherein the pad deformation part comprises:
a fixed portion fixed to the support part;
a first deformation portion extending from the fixed portion to one side of the fixed portion; and
a second deformation portion extending from the fixed portion to an other side of the fixed portion,
wherein the first and second deformation portions support the rear surface of the pad part, and
wherein an angle between the first and second deformation portions increases as the pressure at which a pressing part presses the first jig or the second jig increases.

2. The laminating device of claim 1, wherein the first jig comprises a recessed part having a curved surface on one surface of the first jig, and
the first member is seated on the recessed part to correspond to a shape of the recessed part.

3. The laminating device of claim 2, wherein the pad part has a shape protruding toward the second member.

4. The laminating device of claim 3, wherein, as the pressure at which the pressing part presses the first jig or the second jig increases, a distance between the support part and the second member decreases.

5. The laminating device of claim 1, wherein the angle between the first and second deformation portions is equal to or less than about 180°.

6. The laminating device of claim 1, wherein each of the first and second deformation portions has a plate shape protruding toward the pad part.

7. The laminating device of claim 1, wherein the support part comprises support protrusions overlapping the first and second deformation portions and protruding from the support part toward the first and second deformation portions, and    each of the support protrusions has a height less than that of the fixed portion.

8. The laminating device of claim 1, wherein the first deformation portion has a shape that is symmetrical to that of the second deformation portion with respect to the fixed portion.

9. The laminating device of claim 1, wherein the first member is a cover window, and the second member is a panel member.

\* \* \* \* \*